United States Patent Office 2,800,485
Patented July 23, 1957

2,800,485

METHOD OF MAKING MONO-(α-ARYL)-SUBSTITUTED PYRIDINEMETHANOLS

Ansel P. Swain, Springfield Township, Montgomery County, Pa., assignor to McNeil Laboratories, Inc., Philadelphia, Pa., a corporation of Pennsylvania No Drawing. Application February 28, 1955,
Serial No. 491,213

13 Claims. (Cl. 260—297)

The present invention relates to a novel method for making mono-(α-aryl)-substituted pyridinemethanols; and, more particularly, the invention relates to a novel method for preparing the stated compounds by which materially higher yields of the resulting product are provided than have been obtained by prior methods. The invention also relates to a novel step for making mono-(α-aryl)-substituted pyridinemethanols in the preparation of dialkylaminoalkyl ethers of mono-(α-aryl)-substituted pyridinemethanols.

The dialkylaminoalkyl mono-(α-aryl)-substituted pyridylmethyl ethers comprise a group of compounds possessing antihistaminic properties. These compounds are prepared by condensing the appropriate mono-(α-aryl)-substituted pyridinemethanol with the desired dialkylaminoalkyl halide. One of the most valuable of these antihistaminic compounds is 2-[parachloro-α-(2-dimethylaminoethoxy)benzyl]pyridine, prepared as by condensing α-(parachlorophenyl)-2-pyridine-methanol with dimethylaminoethyl chloride using sodium or sodium amide as condensing agent.

The mono-(α-aryl)-substituted pyridinemethanols have been prepared by three methods: (I) the reaction of an aryl aldehyde with a 2-pyridylmagnesium bromide; (II) the condensation of picolinic acid with an aryl aldehyde; and (III) the reaction of pyridyllithium and an aryl aldehyde at −40° C. The first two methods (I and II) are discussed at pages 887 et seq. of Journal of the American Chemical Society, 71 (1949). By method I the reported yields for the desired compounds range from 19% to 42.5%. The yields following method II run from 2.5% to 49%. In the slated article α-(parachlorophenyl)-2-pyridinemethanol was prepared by method II only and the yield is reported at 37%. Method III is discussed at pages 3856 et seq. of Journal of the American Chemical Society, 73 (1951). Although the yield of α-(parachlorophenyl)-2-pyridinemethanol by this method is 90%, this method is exceedingly expensive and impractical due to the nature of the reactants and the temperature conditions required.

It is the principal object of the present invention to provide a novel method for making mono-(α-aryl)-substituted pyridinemethanols.

It is another object of the present invention to provide a novel method of preparing mono-(α-aryl)-substituted pyridinemethanols by which high yields may be realized.

A further object of the present invention is to provide a relatively simple and inexpensive process for preparing compounds of the type described.

A specific object is to provide a novel method for preparing α-(parachlorophenyl)-2-pyridinemethanol in unusually high yields.

Other objects, including the provision of a novel step for the synthesis of mono-(α-aryl)-substituted pyridinemethanols in the preparation of dialkylaminoalkyl ethers of mono-(α-aryl)-substituted pyridinemethanols, will become apparent from a consideration of the following specification and the claims.

The process of the present invention comprises reacting one mole of a pyridinealdehyde with one mole of an arylmagnesium halide to form the corresponding mono-(α-aryl)-substituted pyridinemethanol.

The method of the present invention possesses many marked advantages over prior procedures for preparing mono-(α-aryl)-substituted pyridinemethanols. The method results in very high yields of product, particularly as compared to methods I and II discussed hereinabove. In fact, by the present method yields as high as 95–96% of the product have been obtained. Moreover, the reactants employed in accordance with the present method are substantially less expensive than many of the reactants required by the prior known methods. Thus, the picolinic acid required in method II is more expensive than the pyridinealdehyde used in the present method, and the pyridylmagnesium bromide required in method I and the pyridyllithium required in method III are several times more costly than the pyridinealdehyde. Moreover, the present reaction can be carried out at normal temperatures. This is to be contrasted to method III, for example, where temperatures on the order of −40° C. are required.

The present method is applicable to the preparation of a wide variety of mono-(α-aryl)-substituted pyridinemethanols. Thus, the pyridine ring may be substituted or unsubstituted, and the aryl substituent may be substituted or unsubstituted. The nature of the product, that is whether the pyridine ring portion is substituted or unsubstituted or the aryl ring portion is substituted or unsubstituted, will depend, of course, upon the nature of the reactants, that is whether the pyridine ring portion of the pyridinealdehyde or the aryl ring portion of the arylmagnesium halide are substituted or unsubstituted. Where the pyridine ring portion of the pyridinealdehyde or the aryl portion of the arylmagnesium halide is substituted, one or more substituents may be present, on one or the other or both rings, and these substituents may be halogen, especially chlorine; alkyl, especially alkyl groups containing up to four carbon atoms, such as methyl, ethyl, propyl and butyl; alkoxy, especially those corresponding to the alkyl groups just mentioned; dialkylamino, especially those in which the alkyl groups contain up to four carbon atoms, such as dimethylamino, diethylamino, and the like.

Referring further to the aryl portion of the arylmagnesium halide, it will most generally be a phenyl or naphthyl group, substituted or unsubstituted, preferably a phenyl group. Herein and in the claims where reference is made to "a pyridinealdehyde," "an arylmagnesium halide," "a phenylmagnesium halide," "a naphthylmagnesium halide," and the like, without further qualification, it will be understood to refer to the substituted derivatives as discussed above as well as to the unsubstituted compounds.

The position of the aryl-substituted methanol group in the product, and hence of the aldehyde group in the pyridinealdehyde, with respect to the pyridine nitrogen atom, may be in any available place on the pyridine ring. In the preferred compounds, however, these groups will be in the 2-position.

The arylmagnesium halide is a Grignard type reagent, and while the compound may be a chloride, iodide or bromide, it is preferably a bromide.

The method, as stated, comprises reacting the appropriate pyridinealdehyde with the appropriate arylmagnesium halide to produce the corresponding mono-(α-aryl)-substituted pyridinemethanol. The reaction may be illustrated by the following general equation:

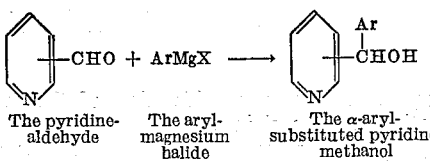

| The pyridine- | The aryl- | The α-aryl- |
| aldehyde | magnesium | substituted pyridine- |
|  | halide | methanol |

More specifically, the reaction may be illustrated by the following specific equation representing the production of the preferred α-(parachlorophenyl)-2-pyridinemethanol by reaction between 2-pyridinealdehyde and parachlorophenylmagnesium bromide:

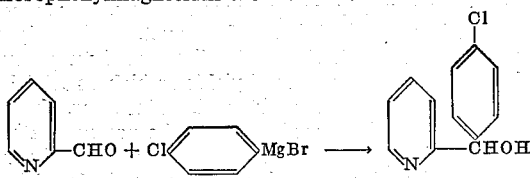

As will be discussed more in detail hereinafter and as will be apparent to those familiar with Grignard synthesis the direct product of the reaction in the reaction mixture is actually a mono-(α-aryl)-substituted pyridinemethoxymagnesium halide (not shown in the above equations) which is, in accordance with normal Grignard practice, converted to the corresponding methanol.

In carrying out the reaction, one mole of the pyridinealdehyde reacts per mole of the arylmagnesium halide, although, as a practical matter, some excess of one or the other of the reactants may be employed, most generally the arylmagnesium halide. Thus, in accordance with the broader aspects of the process, all that is required is the careful mixing of the pyridinealdehyde and the arylmagnesium halide in the desired proportions. The reaction medium must be free of water, and preferably an anhydrous organic solvent is employed as reaction medium. The arylmagnesium halide will normally be prepared and available as a solution thereof, and such solution may be used, the solvent thereof serving as the reaction medium in the present process. The solvents normally associated with the arylmagnesium halide are the simple dialkyl ethers, such as diethyl ether, dibutyl ether, diamyl ether, and the like; the alkyl aryl ethers, such as methyl phenyl ether, and the like; tertiary amines, such as dimethylaniline, and the like; aromatic hydrocarbons, such as benzene, toluene, xylene, and the like; aliphatic hydrocarbons, such as petroleum ether, and the like. These materials, as stated, are suitable for serving as the reaction medium in the present method. Hence, the pyridinealdehyde may be mixed with the solution of arylmagnesium halide, preferably by adding the former to the latter. The preferred reaction medium is an ether, particularly a dialkyl ether.

As is conventional in Grignard reactions, a small amount of iodine, such as an iodine crystal, may be included in the reaction mixture to facilitate initiation of the reaction. In this connection, where the reaction medium is one of the hydrocarbon solvents mentioned above, it may be necessary also to include a small amount of one of the other solvents, such as one of the ethers, tertiary amines, or the like, to facilitate initiation of the reaction.

The reaction is exothermic, and the reaction may be violent if the reactants are mixed without care. Hence, the reactants are mixed or added one to the other at such a rate as to maintain the reaction within readily controllable bounds. Preferably, as stated, the pyridinealdehyde is added to the solution of the arylmagnesium halide, and in this embodiment, the pyridinealdehyde is added slowly at such a rate that the heat liberated does not cause excessive boiling of the solvent and flooding of the condensing system.

As far as the actual temperature conditions maintained during the reaction are concerned, the reaction will take place at widely varying temperatures from as low as 0° centigrade up to the boiling point of the reaction medium. However, the reaction is slow at low temperatures, and since the reaction is exothermic, the maintainence of such temperatures would require heavy cooling equipment. Since the reaction takes place at a more rapid rate as elevated temperatures, the heat liberated during the reaction may be relied upon to provide the desired temperature, the rate of mixing or addition of the reactants, and cooling means if desired, also being relied upon to maintain the temperature at the desired level. Advantageously, the reaction is carried out under refluxing conditions through controlled addition of the pyridinealdehyde to the solution of the arylmagnesium halide. Of course, in carrying out the reaction at elevated temperatures, due consideration will be had to the possible decomposition of the reactants and/or the reaction product. Hence, in any particular case temperature conditions will be observed commensurate with known decomposition characteristics of the particular reactants employed and product produced.

During the reaction, the pyridinealdehyde and the arylmagnesium halide combine to produce, in the reaction medium, the corresponding mono-(α-aryl)-substituted pyridinemethoxymagnesium halide. In many cases this material will exist principally in suspension in the reaction medium. In accordance with conventional Grignard synthesis practice, this material is converted to the corresponding alcohol. This conversion generally takes place through hydrolysis by the use of water, aqueous acids, including aqueous solutions of acid salts, or aqueous bases, including aqueous solutions of basic salts, although other reagents, such as dry ammonium salts, like ammonium chloride, anhydrous acids, like hydrogen chloride gas, and the like, may be used.

During conversion of the mono-(α-aryl)-substituted pyridinemethoxymagnesium halide, if water alone is used, gelatinous magnesium hydroxide is formed and mingles with the desired product. Since this magnesium hydroxide is difficult to separate, it is preferred to employ, during the conversion, aqueous acid to form a water-soluble magnesium salt. The resulting aqueous layer then contains both the magnesium salt and the salt of the (α-aryl)-substituted pyridinemethanol in solution. The (α-aryl)-substituted pyridinemethanol can be precipitated by the addition of ammonia or amines which at the same time hold the magnesium in solution as a complex. The precipitated alcohol may then be separately recovered. Conversion by means of an aqueous base causes precipitation of magnesium hydroxide in the aqueous phase, and the desired product, in the form of the free base, is in solution in the organic solvent phase. The product may then be recovered readily by removal of this solvent phase and evaporation.

The conversion reaction is also exothermic, and considerations comparable to those mentioned above in the case of the principal reaction, will be observed during this phase of the procedure.

Following recovery of the (α-aryl)-substituted pyridinemethanol, the product may, if desired, be further purified following conventional practice. It may not be necessary to separate the product as such in pure form. For example, the product may be retained in solution, such as in the above-mentioned solvent phase for utilization in a subsequent reaction.

As stated, one of the principal uses for the (α-aryl)-substituted pyridinemethanols is in the synthesis of ethers possessing antihistaminic properties, especially the dialkylaminoalkyl ethers. These ethers are prepared by condensing the appropriate (α-aryl)-substituted pyridinemethanol with the appropriate dialkylaminoalkyl halide. Sodium or sodium amide is generally used as condensing agent. In this connection the (α-aryl)-substituted pyridinemethanol is normally first reacted with the sodium or sodium amide to form the corresponding sodium alkoxide which in turn is reacted with the dialkylaminoalkyl halide. These reactions generally take place in a suitable inert organic solvent. Among the solvents available, the aromatic hydrocarbons, such as benzene, toluene, xylene, and the like, especially toluene, are particularly suitable. The reactions are generally carried out at a temperature ranging from above room temperature to the boiling point, with refluxing being preferred.

The process of the present invention will be more readily understood from a consideration of the following specific examples which are given for the purpose of illustration only and are not intended to limit the scope of the invention in any way:

*Example I*

Phenylmagnesium bromide is prepared from 26.7 g. (1.1 gram atoms) of magnesium and 188.4 g. (1.2 moles) of dried bromobenzene in about 700 ml. of anhydrous ether containing a crystal of iodine. To the resulting solution are slowly added 107.0 g. (1.0 mole) of 2-pyridinealdehyde at a rate to maintain refluxing. The mixture is allowed to stand overnight at room temperature, and is then poured over crushed ice and acidified with concentrated hydrochloric acid. The separated ether layer is removed. Addition of concentrated ammonium hydroxide to the aqueous layer causes separation of an oil which solidifies readily. The mixture is extracted with several portions of ether to dissolve all of the solid. The ether extract is dried over potassium carbonate. Evaporation of the dried ether extract yields 175.3 grams (95%) of α-phenyl-2-pyridinemethanol which solidifies on standing to a crystalline solid melting at 75–76° C.

*Example II*

A solution of parachlorophenylmagnesium bromide is prepared by adding dropwise a solution of 230 g. (1.2 moles) of para-bromochlorobenzene in 900 cc. of anhydrous ether to 26.7 g. (1.1 gram atoms) of magnesium suspended in 100 cc. of anhydrous ether containing a small crystal of iodine. To this solution, 107 g. (1 mole) of 2-pyridinealdehyde are added slowly with stirring at a rate to maintain refluxing. After the addition is complete, the reaction mixture is stirred for one hour at room temperature. The mixture is then poured onto an equal volume of crushed ice and water and acidified with concentrated hydrochloric acid. The ether layer is removed. The aqueous layer is made basic with ammonia and extracted with ether. The ether solution is evaporated and the residue dried by addition of benzene and removal by distillation to give 208 g. (95%) of solid α-(parachlorophenyl)-2-pyridinemethanol melting at 78–80° C.

A solution of 219 g. (1 mole) of α-(parachlorophenyl)-2-pyridinemethanol in one liter of dry toluene is heated to 100° C. with stirring. Twenty three grams (1 gram atom) of sodium are then added in portions. After all the sodium has reacted, a dried solution of 2-dimethylaminoethyl chloride in benzene is added. This benzene solution is prepared by dissolving 173 g. (1.2 moles) of 2-dimethylaminoethyl chloride hydrochloride in the minimum amount of water, adding 500 cc. of benzene followed by 300 g. of sodium carbonate decahydrate, stirring, separating the benzene layer and drying.

The mixture is refluxed with stirring for ten hours, cooled and filtered. The filtrate is extracted three times with 200 cc. portions of 6 N acetic acid. The aqueous acetic acid solution is then made strongly basic with 10% sodium hydroxide solution, and extracted three times with 200 cc. portions of ether. The ether extract is dried with anhydrous sodium sulfate, stirred with 5 g. of activated carbon and filtered to provide 2-[parachloro-α(2-dimethylaminoethoxy)benzyl]pyridine in solution.

Addition of a solution of 116 g. (1 mole) of maleic acid in 1500 cc. of ether gives 323 g. (79%) of solid which, on recrystallization from ethyl acetate, gives white solid 2-[parachloro-α(2 - dimethylaminoethoxy)benzyl]-pyridine maleate melting at 117–119° C.

Considerable modification is possible in the selection of the reactants and in the particular techniques followed without departing from the scope of the invention.

I claim:
1. The method of making a mono-(α-aryl)-substituted pyridinemethanol which comprises the step of reacting one mole of a pyridine-aldehyde with one mole of an arylmagnesium halide in non aqueous medium.
2. The method of making a mono-(α-aryl)-substituted pyridinemethanol which comprises the step of reacting one mole of a 2-pyridinealdehyde with one mole of an arylmagnesium halide selected from the group consisting of the phenyl- and naphthylmagnesium halides in nonaqueous medium.
3. The method of claim 2 wherein the arylmagnesium halide is a phenylmagnesium halide.
4. The method of claim 3 wherein the phenylmagnesium halide is a phenylmagnesium bromide.
5. The method of making α-(parachlorophenyl)-2-pyridinemethanol which comprises the step of reacting one mole of 2-pyridinealdehyde with one mole of a parachlorophenylmagnesium halide in non-aqueous medium.
6. The method of claim 5 wherein the parachlorophenylmagnesium halide is parachlorophenylmagnesium bromide.
7. The method of making a mono-(α-aryl)-substituted pyridinemethanol which comprises the step of slowly adding a pyridinealdehyde to a non-aqueous solution of an arylmagnesium halide.
8. The method of making α-(parachlorophenyl)-2-pyridinemethanol which comprises the step of slowly adding 2-pyridinealdehyde to a non-aqueous solution of parachlorophenylmagnesium bromide.
9. In the preparation of dialkylaminoalkyl ethers of mono-(α-aryl)-substituted pyridinemethanols wherein the mono-(α-aryl)-substituted methanol is first prepared and then condensed with a dialkylaminoalkyl halide, the improvement in the preparation of the mono-(α-aryl)-substituted pyridinemethanol which comprises the step of reacting one mole of a pyridinealdehyde with one mole of an arylmagnesium aldehyde in non-aqueous medium.
10. In the preparation of 2-[parachloro-α(2-dimethylaminoethoxy)benzyl] pyridine wherein α-(parachlorophenyl)-2-pyridinemethanol is first prepared and then condensed with dimethylaminoethyl chloride, the improvement in the preparation of the α-(parachlorophenyl)-2-pyridinemethanol which comprises the step of reacting one mole of 2-pyridinealdehyde with one mole of parachlorophenylmagnesium bromide in non-aqueous medium.
11. The method of making a mono-(α-aryl)-substituted pyridinemethanol which comprises the step of slowly adding a pyridinealdehyde to a solution of an arylmagnesium halide in an anhydrous organic solvent therefor.
12. The method of making a mono-(α-aryl)-substituted pyridinemethanol which comprises the step of slowly adding a pyridinealdehyde to a non-aqueous solution of an arylmagnesium halide at refluxing.
13. The method of making a mono-(α-aryl)-substituted pyridinemethanol which comprises reacting one mole of a pyridinealdehyde with one mole of an arylmagnesium halide in non-aqueous medium, and hydrolyzing the resulting mono - (α-aryl)-substituted pyridinemethoxymagnesium halide.

References Cited in the file of this patent
UNITED STATES PATENTS
2,606,192    Shelton et al. _____ Aug. 5, 1952

OTHER REFERENCES

Kharasch et al.: Grignard Reaction of Nonmetallic Substances, pp. 267, 273–4, N. Y., Prentice-Hall, Inc. (1954).

Wibaut: "Org. Chem.," p. 555, Elsevier Pub. Co., N. Y. (1951).